United States Patent [19]
Carville

[11] Patent Number: 5,885,636
[45] Date of Patent: Mar. 23, 1999

[54] TEMPERATURE-MAINTAINING SYSTEM FOR FOODS

[76] Inventor: James G. Carville, 530 Lake Ave., Bay Head, N.J. 08742

[21] Appl. No.: 718,975

[22] Filed: Sep. 26, 1996

Related U.S. Application Data

[60] Provisional application No. 60/004,436 Sep. 28, 1995.
[51] Int. Cl.⁶ ............................ A21D 10/02; B65D 85/00
[52] U.S. Cl. ........................ 426/209; 206/545; 206/546; 206/499; 206/515; 126/263
[58] Field of Search ............................ 426/109; 206/545, 206/546, 499, 515; 126/263

[56] References Cited

U.S. PATENT DOCUMENTS

| | | | |
|---|---|---|---|
| 2,767,563 | 10/1956 | Picascia | 62/142 |
| 2,850,391 | 9/1958 | Gunberg | 99/171 |
| 3,148,676 | 9/1964 | Troug et al. | 126/246 |
| 3,287,140 | 11/1966 | Brussell | 99/192 |
| 4,246,884 | 1/1981 | Vandas | 126/246 |
| 4,505,252 | 3/1985 | Wada et al. | 126/246 |
| 4,528,218 | 7/1985 | Maione | 428/35 |
| 4,753,085 | 6/1988 | Labrousse | 62/294 |
| 4,762,113 | 8/1988 | Hamasaki | 126/263 |
| 4,771,761 | 9/1988 | Doukhan et al. | 126/263 |
| 4,809,673 | 3/1989 | Charvin | 126/263 |
| 4,917,076 | 4/1990 | Nadolph et al. | 126/375 |
| 4,982,722 | 1/1991 | Wyatt | 126/400 |
| 5,016,756 | 5/1991 | Wischhusen et al. | 206/545 |
| 5,052,369 | 10/1991 | Johnson | 126/400 |
| 5,116,240 | 5/1992 | Wischhusen et al. | 206/545 |

FOREIGN PATENT DOCUMENTS

| | | |
|---|---|---|
| 198659 | 7/1938 | Switzerland . |
| 597 818 | 4/1978 | Switzerland . |

*Primary Examiner*—Lynette F. Smith
*Assistant Examiner*—Ali R. Salimi
*Attorney, Agent, or Firm*—Howson and Howson

[57] ABSTRACT

An improved food delivery system comprises an insulated container and plates that will either generate heat to keep food hot during delivery, or absorb heat to keep food cold during delivery. This combination will hold food for extended periods of time either above a desired elevated temperature, or below a desired lower temperature.

7 Claims, 3 Drawing Sheets

TEMPERATURE-MAINTAINING SYSTEM FOR FOODS

CROSS REFERENCE TO RELATED APPLICATION

This application claims priority of provisional application Ser. No. 60/004,436, filed Sep. 28, 1995.

SUMMARY OF THE INVENTION

This invention relates to the handling of foods, and more particularly to a system for maintaining the temperature of foods as they are being transferred in bulk. The invention has particular application in schools and institutions, and in catering.

The United States Public Health Service requires that all potentially hazardous foods be maintained until served either at 140° F. or above in the case of hot food, or at 40° F. or below in the case of cold food. Within the range of 40° F. to 140° F., rapid bacterial growth can occur. Outside this range, bacterial growth is either prevented, or at least retarded to acceptable levels. For the purpose of the following description, the lower limit of the acceptable range for maintaining hot foods will be referred to as a "desired elevated temperature" or "DET." The upper limit of the acceptable range for maintaining cold foods will be referred to as a "desired lower temperature" or "DLT."

If hot cooked food has to be held for long periods after is has been prepared, it is important to hold the food at a temperature above the DET. In the case of food that is to be served cold, such as a salad, it is important to keep the food at or below the DLT. Presently, food service operators ordinarily use insulated containers and rely on the insulation to keep the temperature of the food from dropping below the DET, or rising above the DLT.

Devices taking advantage of latent heat for keeping hot foods hot and keeping cold foods cold are well known. A typical latent heat device for holding food at a temperature high enough to prevent bacteria from multiplying takes advantage of the latent heat of fusion of wax. The wax is enclosed in a portion of a food container. Before use, the container is heated to melt the wax.

The specific heat of the wax is lower than the specific heat of water and lower than, or approximately the same as, the specific heat of typical water-laden food products. The melted wax loses its heat faster than the food. When the wax reaches its temperature at which it begins to solidify, it will stay at that temperature while it gives up its latent heat. Therefore, the wax lengthens the time that the food is held above the DET. Under certain conditions, the wax can even raise the temperature of the food if it is under the DET.

Similarly, in the case of cold foods, a gel may be enclosed in a portion of the food container. A suitable gel is a water hydroset of food grade carboxy methyl cellulose and potable water. The gel is preliminarily converted to the solid phase by freezing. When its temperature increases to the transition point, the gel absorbs heat from the food and also heat being conducted through the walls of the insulated container, and thereby lengthens the time that the food is held below the DLT.

Devices utilizing latent heat to maintain foods at desired temperatures are disclosed in Swiss Patents 198,659, dated Sep. 16, 1938 and 597,818 dated Apr. 14, 1978, and in the following U.S. Pat. Nos.:

| | |
|---|---|
| Truog et al. | 3,148,676 |
| Vandas | 4,246,884 |
| Wada et al. | 4,505,252 |
| Wyatt | 4,982,722 |
| Johnson | 5,052,369 |

Alternatively, foods can be kept cold using a gel which is provided in the frozen condition. The gel takes up heat as it melts, and therefore, in the case of a frozen gel, the invention also takes advantage of latent heat, but in a different way.

Other schemes for maintaining food temperatures utilize high specific heat substances for heat storage, or exothermic or endothermic chemical reactions. Examples of such schemes are described in the following U.S. Pat. Nos.:

| | |
|---|---|
| Picascia | 2,767,563 |
| Gunsberg | 2,850,391 |
| Brussell | 3,287,140 |
| Maione | 4,528,218 |
| Labrousse | 4,753,085 |
| Hamasaki | 4,762,113 |
| Doukhan et al. | 4,771,761 |
| Charvin | 4,809,673 |
| Nadolph et al. | 4,917,076 |

The warming and cooling devices of the prior art, utilizing latent heat, heat storage, and chemical reaction are useful for maintaining the desired temperature of individual servings and small quantities of food. Thus, they find use in plate warmers and small food containers. However, no satisfactory system has been devised for maintaining a desired temperature in foods being transported in bulk, as in the case of foods being transported by truck from a preparation center to schools and other institutions, or in the case of foods being transported by a caterer.

The principal object of this invention is to provide an improved food delivery system in which foods can be maintained above the DET or below the DLT for an extended period of time while being transported.

Another object of the invention is to provide an effective, temperature-controlled food delivery system utilizing latent heat, in which the heat storage components take up only a small amount of space.

Still another object of the invention is to provide a temperature-controlled food delivery system which can be readily converted from a hot food system to a cold food system.

The invention addresses the foregoing objects by providing for the stacking of food-containing trays, and temperature-maintaining plates utilizing latent heat, with the temperature-maintaining plates received in recesses formed in covers of the food-containing trays. Preferably, a stack of trays and temperature-maintaining plates is transported in an insulated container.

In its preferred form, the food transporting apparatus in accordance with this invention comprises a plurality of trays, each having a tray bottom and tray sidewalls extending upwardly from the edges of the tray bottom, whereby each tray is capable of containing food, the tray sidewalls having upper edges forming a rim; a cover on each tray, the cover comprising a flange engageable with the rim of a tray, a horizontal panel and means connecting the panel to the flange, the panel being located at a level below the level of the flange, whereby the panel and the connecting means define a recess; a temperature maintaining plate located in the recess of each tray, the temperature maintaining plate comprising a top wall, a bottom wall and side walls forming a sealed enclosure and a temperature-maintaining material substantially filling the enclosure, the temperature-maintaining material comprising a fusible substance in a state such that it changes phase between solid and liquid as its temperature approaches ambient temperature; and a temperature-insulated container receiving said trays in a stack, with each tray except for the lowermost tray in the stack resting on a temperature maintaining plate situated in the recess of the cover of a next lower tray.

In the case of a heat-maintaining system, the fusible substance is preferably a petroleum wax having a specific heat, in the liquid state of approximately 0.55 BTU/lb/degree F., and in the solid state of approximately 0.50 BTU/lb/degree F., and a latent heat of fusion of approximately 85 BTU/lb.

In its preferred form, the temperature-maintaining plate has unitary bottom and side walls, the side walls have upper edges, and the top wall is a sheet welded to the upper edges of the side walls. The temperature-maintaining plate has a pattern of grooves formed in its bottom wall, the pattern consisting of a first set of parallel grooves, and a second set of parallel grooves, the grooves of the second set intersecting the grooves of the first set substantially perpendicularly.

By combining the temperature-maintaining plates with stacked food trays in an insulated container, especially with the plates situated in recesses in the covers of the food trays, the invention provides for maintenance of a DET or DLT for an extended period of time, making it possible to transport foods safely over longer periods of time. The invention also makes a very efficient use of available space, and provides for easy conversion from a hot food system to a cold food system merely by changing the temperature maintaining plates, and otherwise using the same trays, tray covers and insulated containers.

Further objects, advantages and details of the invention will be apparent from the following detailed description, when read in conjunction with the drawings.

DETAILED DESCRIPTION

Figure 1:
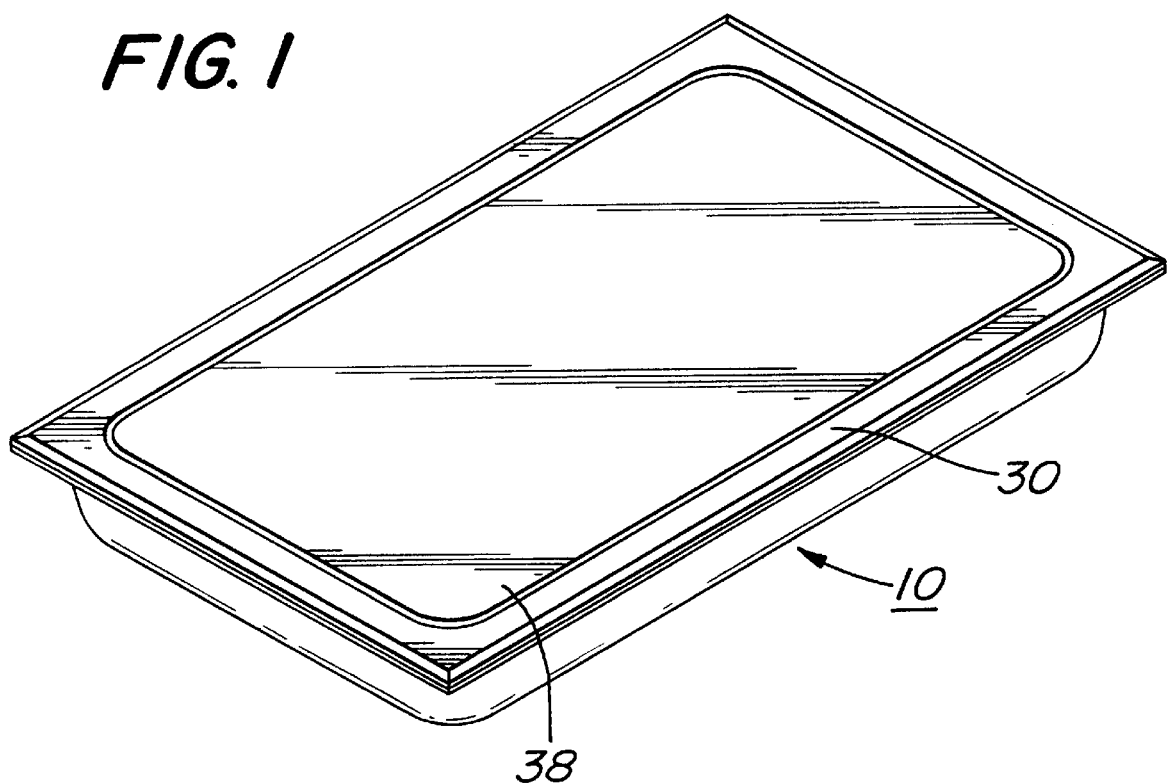
FIG. 1 is a perspective view of a single food tray in accordance with the invention, having a recessed cover and a temperature maintaining plate situated in the recess.
Figure 2:
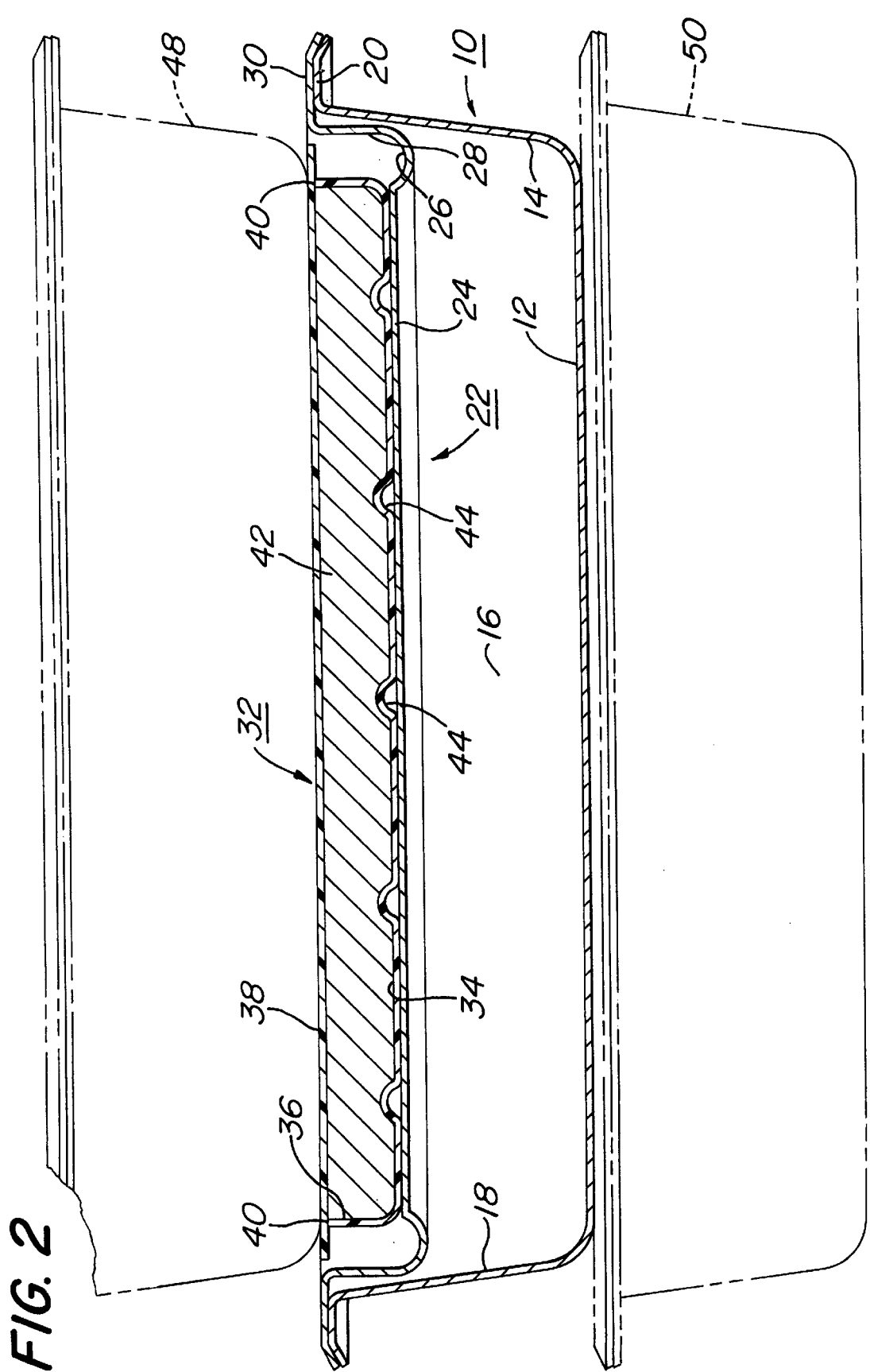
FIG. 2 is a vertical section of the assembly of FIG. 1, showing the relationship of the food tray to other food trays in a stack.

FIGS. 1 and 2 show a stainless steel food tray 10 having a bottom 12 and four side walls, three of which are seen in FIG. 2 at 14, 16 and 18. At the rim of the tray, defined by the upper edges of the side walls, a continuous outwardly extending flange 20 is formed. A stainless steel cover 22 has a bottom panel 24 surrounded by a channel 26, with side walls 28 extending upwardly from the outer sides of the channels to a level above that of the bottom panel. A continuous flange 30, extending outwardly from the upper edges of the side walls 28, conforms to and engages flange 20 of the tray. The bottom panel 24, channel 26 and side walls 28 of the cover define a recess for receiving a temperature-maintaining plate 32. The tray and cover are preferably made of stainless steel or polycarbonate. The tray dimensions are typically 12×20 inches, with a depth of 2½, 4 or 6 inches.

The temperature-maintaining plate 32 has a shell, preferably of polycarbonate, and comprises a vacuum-formed, tray-like unit consisting of a bottom wall 34, side walls 36, and a top wall 38. The top wall 38 is preferably vibration-welded (i.e. welded by frictional heating) to the upper edges 40 of the side walls to form a sealed enclosure. Before the top wall is attached to the side walls, the molded unit is filled with temperature-maintaining material 42.

Figure 3:
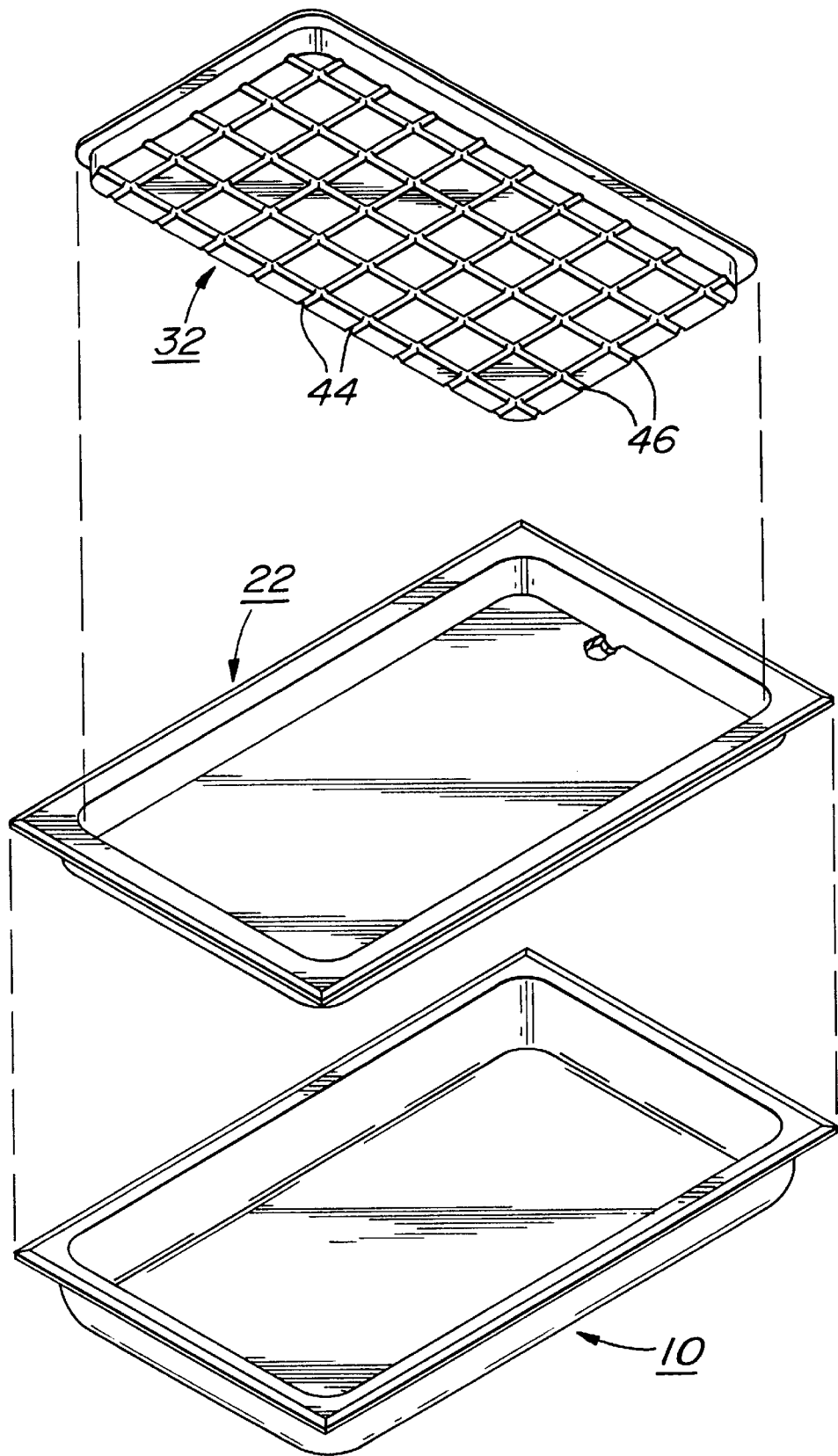
FIG. 3 is an exploded view, in perspective, of the assembly of FIG. 1.

The plate has a grid of grooves in its bottom for reinforcement, to prevent it from bowing out. As shown in FIG. 3, the grid of grooves comprises a first set of parallel grooves 44, and a second set of parallel grooves 46, the grooves of the two sets being mutually perpendicular and intersecting one another. The grooves provide adequate reinforcement for the plate while still allowing contact between the bottom wall 34 of the plate and the bottom 24 of the tray cover over a large area for good heat transfer.

Figure 4:
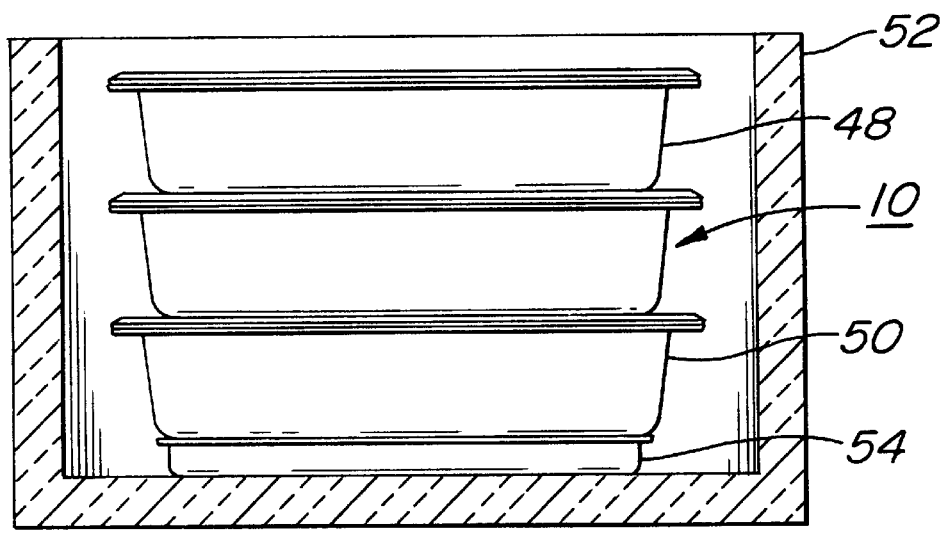
FIG. 4 is a fragmentary vertical section, showing the lower portion of an insulated container, with a stack of food trays situated in the container.

As shown in FIGS. 2 and 4, trays 48, 10 and 50 are stacked one above another in an insulated container 52. Each tray in the stack has a recessed cover, with a temperature-maintaining plate located in the recess. An additional temperature-maintaining plate 54 is located underneath the lowermost tray 50.

Preferably, as shown in FIG. 2, the thickness of the temperature-maintaining plate 32 is substantially equal to the depth of the recess of the cover 22 so that the top wall 38 of the plate 32 is flush with flange 30 of the cover 22. This way, the maximum use is made of the space made available by the recesses of the food tray covers, without increasing the overall size of the insulated container. This flush relationship of the top wall 38 of the plate with the flange 30 of the cover also insures contact of the plates 32 with the bottoms of the trays when the trays are stacked in an insulated container having supporting strips on the inside walls for engaging the flanges of the trays.

For maintaining hot foods above a DET, the temperature-maintaining material should be a fusible substance having a high specific heat and a high total latent heat, with a melting point at or above the DET of the food. Preferably, a the fusible substance is a petroleum wax. The thermal characteristics of petroleum waxes vary, depending primarily upon the oil content of the wax. The characteristics affected by the oil content include the total latent heat, the heat of fusion, the specific heat (both in the liquid and solid states) and the melting point.

The following table shows the thermal characteristics for typical petroleum waxes available from I.G.I. Boler Petroleum Company, 85 Old Eagle School Road, Wayne, Pa., 19087. These waxes are identified by an I.W.L. grade number, the term "I.W.L." referring to International Waxes, Ltd., an affiliate of IGI Boler Petroleum Company, Ltd.

| IWL Grade Number | 1230 | 1236 | 1240 | 1245 | 1255 | 1260 |
| --- | --- | --- | --- | --- | --- | --- |
| M.P. °F. (ASTM) | 125 | 130 | 135 | 138 | 147 | 152 |
| Specific Heat Liq. BTU/lb./°F. | 0.55 | 0.55 | 0.55 | 0.56 | 0.57 | 0.57 |
| Specific Heat Sol. BTU/lb./°F. | 0.5 | 0.5 | 0.5 | 0.5 | 0.5 | 0.5 |
| Total Latent Heat BTU/lb. | 111 | 97.6 | 95.2 | 92.8 | 90.2 | 89.4 |
| Heat of Fusion BTU/lb | 90.7 | 80.3 | 78.8 | 77.2 | 86.3 | 89.4 |

Some waxes exhibit a transition from one crystalline structure to another at a specific temperature below the melting point. The transition is accompanied by the release of heat, referred to as "heat of transition." The total latent heat is the sum of the heat of fusion and the heat of transition. This accounts for the differences between total latent heat and heat of fusion in the above table. The heat of transition tends to be smaller in higher melting waxes, and consequently the total latent heat and heat of fusion are nearly the same in those waxes.

Of the waxes in the above table, only I.W.L. Grade Numbers 1255 and 1260 have melting points high enough to maintain a DET of 140° F.

In practice, the temperature maintaining plates for hot foods are heated preliminarily to melt the wax. The food trays and temperature maintaining plates are stacked in an insulated container for transportation. As stated previously, the wax loses its heat faster than the food. When the wax reaches its temperature at which it begins to solidify, it will stay at that temperature while it gives up its latent heat. Therefore, the wax lengthens the time that the food is held above the DET.

If the mass of the wax is at least a predetermined percentage of the mass of the food, adequate heat will be available to keep the food from dropping below the desired temperature. The desired temperature may be either the DET, or a still higher temperature if it is desirable to continue cooking of the food, while it is in transit or while it is being held before serving at a location where there is no heated holding equipment available.

Since the energy available for heating is a function of the latent heat, one pound of wax having a latent heat of 100 BTU/lb. would be able to raise one pound of water 100°, or the energy will be available to keep the water temperature from dropping below the present DEL. Thus, if there are 10 pounds of food inside the insulated container, 10 BTUs would have to be given up to lower the temperature of the food by one Degree F. This heat loss can be offset (at the DEL) by one pound of wax having a latent heat of 100 BTU/lb.

In a typical food service tray containing approximately 10 pounds of food, a temperature maintaining plate containing 2 pounds of wax, only 5% of the energy available in the wax is needed to raise the temperature of the food by 1 Degree F.

With prior food transportation containers, the best that could be expected is a temperature drop of 35° F. over five hours. By way of contrast, with the temperature-maintaining system of this invention, using a wax having a melting point of 155° F., it is possible to maintain food above the DET within a 5° F. range over six hours.

In the case of cold foods, the preferred temperature maintaining plate is structurally identical to the plate for hot foods. However, instead of wax, the plate contains a gel having a fusion point below the DLT, which is typically 40° F. While it is possible to use less expensive materials to make the plate for cold foods, it is desirable to use polycarbonate, since the plate should be able to withstand the high temperatures of the water in commercial dishwashers.

The plates for cold and hot foods are interchangeable with each other, and consequently it is possible to use the same trays and insulated containers at different times to handle both hot and cold foods. The temperature-maintaining plates for hot and cold foods can be distinguished from each other by dyeing the wax in the hot food plates red and dyeing the gel in the cold food plates blue. Alternatively, dyes can be incorporated in the resins from which the plates are made. The plates can also be distinguished from each other by printing instructions on the plates in different colors.

Various modifications can be made to the invention described above. For example, instead of making the temperature maintaining plate from a vacuum formed tray and a flat cover, the plate can be a unitary, hollow structure having a small opening for filling. Reinforcements other than the rectangular pattern of grooves can be used, and materials other than waxes and gels can be used in the temperature maintaining plates. As mentioned previously, the temperature maintaining plate can even be used to raise the temperature of food if the temperature of the food is below the DET. This can be achieved if the ratio of the mass of the fusible temperature-maintaining material to the mass of the food is sufficiently high. These and other modifications can be made without departing from the scope of the invention as defined in the following claims.

What is claimed is:

1. Apparatus for transporting foods and maintaining the temperature of the foods within a desired range during transportation, comprising a plurality of trays, each tray comprising a bottom and side walls with upper edges forming a rim, and a removable cover on each tray, disposed above its bottom, the bottom, side walls and cover of each tray defining an enclosure, and the cover of each tray being formed with an upwardly open recess defining a space at least part of which is located below the rim of the tray, the trays being arranged in a stack with a temperature-maintaining plate in each of said recess, the trays containing food, and the temperature maintaining plates containing a fusible substance at a temperature such that its fusion temperature is between the temperature of the fusible substance and the ambient temperature.

2. Apparatus according to claim 1 including an insulated container, said stack of trays being located within said insulated container.

3. Apparatus for transporting foods and maintaining the temperature of the foods within a desired range during transportation, comprising:

a plurality of trays, each comprising a tray bottom and tray sidewalls extending upwardly from the edges of the tray bottom, whereby each tray is capable of containing food, the tray sidewalls comprising upper edges forming a rim;

a cover on each tray, the cover comprising a flange engageable with the rim of a tray, a horizontal panel and means connecting the panel to the flange, the panel being located at a level below the level of the flange, whereby the panel and the connecting means define a recess;

a temperature maintaining plate associated with each tray, at least part of each temperature maintaining plate being located within the recess of the cover of, and below the rim of, the tray with which it is associated, the temperature maintaining plate comprising a top wall, a bottom wall and side walls forming a sealed enclosure and a temperature-maintaining material substantially filling the enclosure, the temperature-maintaining material comprising a fusible substance in a state such that it changes phase between solid and liquid as its temperature approaches ambient temperature; and a temperature-insulated container receiving said trays in a stack, with each tray except for the lowermost tray in the stack resting on a temperature maintaining plate at least part of which is located in the recess of the cover of a next lower tray.

4. Apparatus according to claim 3 in which the fusible substance is a petroleum wax.

5. Apparatus according to claim 3 in which the fusible substance is a petroleum wax, the specific heat of which, in the liquid state, is approximately 0.55 BTU/lb/degree F., and, in the solid state, is approximately 0.50 BTU/lb/degree F., and the latent heat of fusion of which is approximately 85 BTU/lb.

6. Apparatus according to claim 3 in which the bottom and side walls of the temperature-maintaining plate are unitary, in which the side walls comprise upper edges, and in which the top wall is a sheet welded to the upper edges of the side walls.

7. Apparatus according to claim 3 in which a pattern of grooves is formed in the bottom wall of the temperature-maintaining plate, the pattern of grooves consisting of a first set of parallel grooves, and a second set of parallel grooves, the grooves of the second set intersecting the grooves of the first set perpendicularly.

* * * * *